June 23, 1964   F. G. SUCKOW   3,138,264

FRICTION-RUBBER DRAFT GEAR

Filed May 22, 1961

Inventor:
Fred G. Suckow

By Wilmer Mechlin
his Attorney

United States Patent Office 3,138,264
Patented June 23, 1964

3,138,264
FRICTION-RUBBER DRAFT GEAR
Fred G. Suckow, Bowmansville, N.Y., assignor to Symington Wayne Corporation, Salisbury, Md., a corporation of Maryland
Filed May 22, 1961, Ser. No. 111,730
15 Claims. (Cl. 213—30)

This invention relates to friction-rubber draft gears for railway vehicles and is an improvement on the draft gear of Blattner Patent 2,919,819, issued January 5, 1960.

The problems posed in recent years by the increase in the length and speed of trains and the speed at which cars are humped in classification yards has led the Association of American Railways (A.A.R.) to raise the capacities required of draft gears fittable into the standard 24⅝ in. pocket. Also, deeming it questionable whether draft gears of sufficient capacity to meet present and anticipated future requirements could be designed to fit into the standard pocket, the A.A.R. increased the permissive length of draft gear pockets in new construction cars to 36 in. so as to accommodate gears of correspondingly greater length and, presumably, higher capacity.

In an endeavor to meet the demands for higher capacity, a number of draft gears for standard pockets have been introduced. These draft gears in their cushioning means have been of three types, one rubber, another friction and the third combined rubber and friction. As explained in the Blattner patent, the rubber type has high ultimate capacity due to the high resistance of rubber to compression as it approaches its compressive limit but low capacity at partial travel, while the friction type has a higher capacity than the rubber type on partial travel but a lower ultimate capacity. Since the demands were for higher capacities at both partial and full travel, the chances that they could be met were best with the rubber and friction type which, in using both rubber and friction cushioning units, combines the higher capacity on partial travel of a friction gear with that on full travel of a rubber gear. It therefore was to be expected that the combined rubber and friction draft gear of the Blattner patent would have good operating characteristics. However, it was hardly to be expected that even such gears, when of a size fittable into a 24⅝ in. pocket, would have capacities on the order of those, the demand for which had occasioned the increase in the permissive length of the standard draft gear pocket. It therefore was startling to the trade that in its approval tests the draft gear of the Blattner patent, adapted for a 24⅝ in. pocket, not only had ample capacity on partial travel but had an ultimate capacity of 51,600 ft. lbs., far higher than any draft gear for such a pocket that had ever been approved by the A.A.R. Even today, several years after its approval, the draft gear of the patent is in the enviable position among draft gears fittable into a standard 24⅝ in. pocket of having but one competitor of anywhere near comparable performance.

The Blattner gear and its nearest competitor for applications to standard 24⅝ in. pockets have full travels of 2.62 in. and 3¼ in., respectively, and at these full travels each has a capacity of around 51,000 ft. lbs. With the ultimate capacities of these two draft gears far beyond those of draft gears previously approved for 24⅝ in. pockets and within less than 200 ft. lbs. of each other, it was reasonable to presume that the ultimate in the capacity of draft gears of such size had been reached. In keeping, the A.A.R. in its recent specification M901E-59 sets the requirements for high capacity draft gears of 3¼ in. travel for standard 24⅝ in. pockets as a minimum capacity of 36,000 ft. lbs. at a reaction of 500,000 lbs. and a maximum capacity at ultimate reaction of 800,000 lbs. Yet even these requirements, which a few years ago would have been considered unattainable, are met by the draft gear of this invention and with a margin over the Blattner gear and its nearest competitor comparable with their margin over prior draft gears. Thus, a prototype draft gear in tests had a capacity of about 49,000 ft. lbs. at a reaction of 500,000 lbs. and an ultimate capacity on the order of 62,300 ft. lbs. with a reaction at that capacity of only 630,000 lbs.

It therefore is the primary object of the present invention to provide an improved friction-rubber draft gear which, in a size fittable into a standard 24⅝ in. draft gear pocket, far more than meets the latest A.A.R. specification for high capacity draft gears for such pockets.

Another object of the invention is to provide an improved friction-rubber draft gear having an increased maximum travel obtained with an increase in rather than at the expense of the space available for its rubber cushioning means, whereby a maximum ultimate capacity is obtained with a minimum of reaction force.

An additional object of the invention is to provide a housed friction-rubber draft gear whereby maximum capacity and minimum reaction are obtained by an increase in maximum travel with increase in both the size of the rubber means and the bearing area of the friction means.

A further object of the invention is to provide a housed friction-rubber draft gear wherein shoes of the friction means, while normally projecting beyond an end of the housing, are movable inside that end by longitudinal forces, whereby maximum travel is obtained within the limits imposed by the pocket for which the draft gear is designed.

Another object of the invention is to provide a housed friction-rubber draft gear wherein the longitudinal forces by which friction shoes normally projecting beyond the open end of the housing are forced into the housing inside that end, are transmitted to the shoes by a plunger, the body portion of which bears against the shoes and normally is disposed outside the housing.

A further object of the invention is to provide a housed friction-rubber draft gear whereby a plunger, while required in transmitting longitudinal forces to the cushioning means to move from a normal position outside the housing to one in which it projects thereinto, is made lockable to the housing.

An additional object of the invention is to provide a housed friction-rubber draft gear of the character just described wherein the force-transmitting plunger is locked to the housing through the shoes.

A further object of the invention is to provide a housed friction-rubber draft gear wherein a force-transmitting plunger, locked in normal position to the housing, is effectively centered thereon despite lack of direct guidance from the housing throughout its range of longitudinal travel relative thereto.

Other objects and advantages of the invention will appear hereinafter in the description, be particularly pointed out in the appended claims and be illustrated in the accompanying drawings in which:

Figure 1:
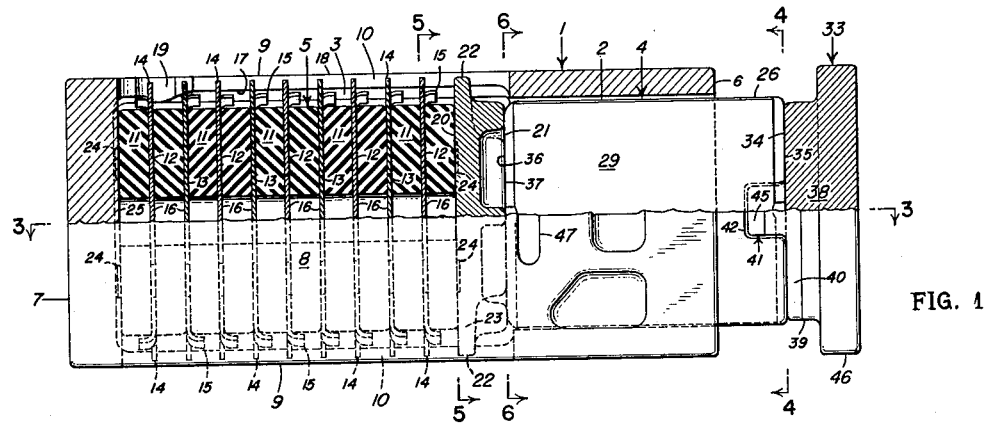
FIGURE 1 is a side elevational view of a preferred embodiment of the draft gear of the present invention with portions broken away and shown in section to more clearly illustrate certain of the details of construction.
Figure 2:
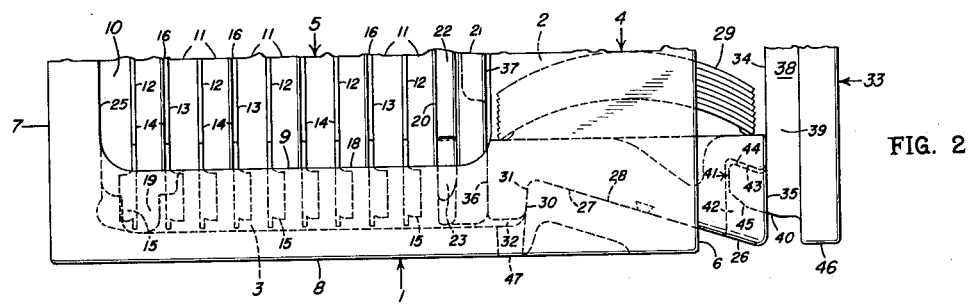
FIGURE 2 is a fragmentary plan view of the draft gear of FIGURE 1.
Figure 3:
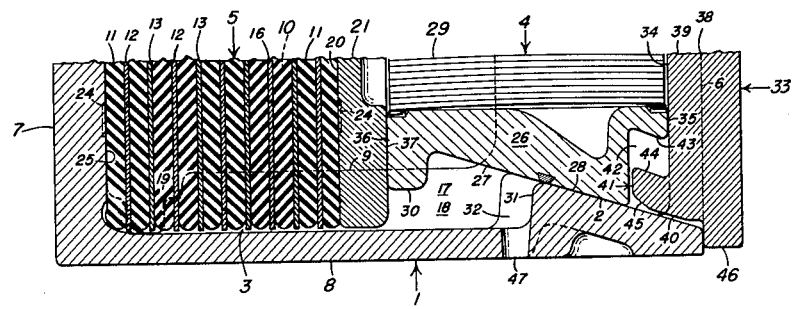
FIGURE 3 is a fragmentary horizontal sectional view taken along lines 3—3 of FIGURE 1.
Figure 4:
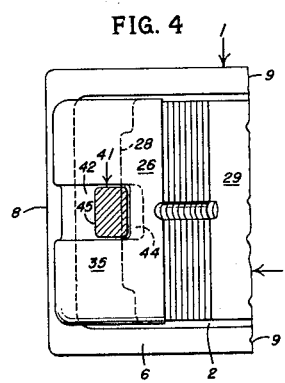
FIGURE 4 is a fragmentary vertical sectional view taken along lines 4—4 of FIGURE 1.
Figure 5:
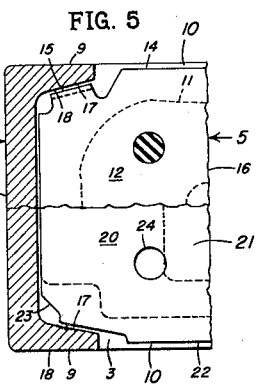
FIGURE 5 is a fragmentary vertical sectional view taken along lines 5—5 of FIGURE 1.
Figure 6:
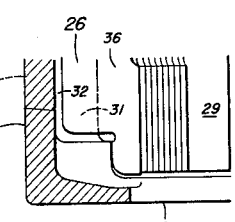
FIGURE 6 is a fragmentary vertical sectional view taken along lines 6—6 of FIGURE 1.

Referring now in detail to the drawings in which like reference characters designate like parts, the improved friction-rubber draft gear of the present invention, while readily adaptable to fit a draft gear pocket of different length, such as the 36 in. pocket approved for new construction cars, is particularly designed in its illustrated embodiment to fit a standard 24⅝ in. draft gear pocket in center sills (not shown). In such size, the prefered draft gear has a maximum travel on the order of 3¼ in., by contrast with the draft gear of the Blattner patent which, in corresponding size, has a maximum travel of around 2½ in. It is basically in the manner in which this longer travel is obtained and the higher capacity but lower reaction consequent thereupon that the draft gear of this invention differs from that of the patent.

As is the draft gear of the Blattner patent, that of this invention is comprised of a housing 1 open at at least one end and housing or containing in tandem in correspondingly arranged connected pockets or seats 2 and 3, friction and rubber cushioning units 4 and 5, respectively. The illustrated embodiment in which one, normally the front, end 6 of the housing is open and the other, opposite or rear end is closed by a vertically disposed rear wall 7, has one cushioning unit of each type with the pocket 3 receiving, accommodating or seating the rubber cushioning unit 5 in the rear portion and that 2 for friction cushioning unit 4 in the front portion of the housing.

The front or outer and rear or inner pockets 2 and 3 are contained, defined or bounded longitudinally by pairs of transversely spaced longitudinal or side walls, all connected at the rear by the rear wall 7. Substantially rectangular in cross-section, the housing 1 has two such pairs of longitudinal walls, each defining an opposite pair of sides, with each wall of each pair joined or connected at the sides to the walls of the other pair.

One pair of the longitudinal walls, here the side walls 8, substantially fully closes the corresponding sides of both pockets. However, the other pair of longitudinal walls, here the top and bottom walls 9, are interrupted intermediate their sides by apertures, openings or slots 10 coterminous longitudinally with but narrower laterally or transversely than the rear pocket 3 seating the rubber cushion or cushioning unit 5. These apertures 10 are designed to enable the rubber of the rubber cushioning unit 5 to flow outwardly in compression beyond the transverse limits of the pocket proper.

The preferred rubber cushion 5 is basically like that of the Blattner patent in being made up of alternating rubber pads 11 and metal plates, the pads being arranged in pairs with the pairs sandwiching and linked or joined to each other through an intervening apertured spring plate 12 and forming therewith a rubber spring unit or element. The rubber spring units, in turn, are spaced from each other by spacer plates 13 which may either be unapertured or, if it is desired to interlock them with the spring units, apertured or dimpled. The rubber pads 11 will ordinarily be of annular or doughnut shape with the holes at their centers providing space into which the rubber can flow inwardly under compressive forces along the adjoining metal plate or plates. Outward flow of the rubber in the pads 11 under the same compressive forces into the apertures 10 also is along the adjoining or associated plate or plates, the spring and spacer plates 12 and 13 for this purpose both having flanges, tongues or extensions 14 projecting or extending transversely into the apertures 10 in the top and bottom longitudinal walls 9 beyond the corresponding confines of the pocket 3. For guiding and positioning the plates 12 and 13 transversely of the housing 1 as they move longitudinally relative thereto on compression and subsequent expansion of the rubber pads 11 in response to longitudinal forces, each of the plates has a plurality of tabs or guides 15 conveniently formed integrally with and bent forwardly or, in the case of the rear spring plate, rearwardly from its main or body portion 16 and extending substantially parallel to and adapted to engage and ride on one of the plurality of guide surfaces 17 forming the inner faces of webs 18 on the apertured longitudinal walls 9 bounding the opposite sides of the apertures 10. To limit movement in both transverse directions, the guide surfaces and the tabs, while extending horizontally, are obliquely disposed transversely, this disposition in the case of the guide surfaces 17 conveniently being derived by tapering the webs 18 toward the apertures 10 bounded thereby.

Similar in the above respects to the draft gear of the Blattner patent but having a longer rear pocket and a correspondingly greater number of rubber spring units for greater capacity at maximum travel, the preferred form of the draft gear of this invention also is similar to that of the Blattner patent in having the webs 18 at opposite sides of one of the apertures 10 relieved adjacent their rear ends to provide in effect an entry slot 19 through which the components of the rubber cushion 5 can be inserted sideways, one by one, into the rear pocket 3.

Abutting at one end, here the rear, against the rear wall 7, the rubber cushioning unit 5 at its opposite or front end abuts against the rear face 20 of a floating spring or intermediate follower or follower plate 21 contained in the front end portion of the rear pocket 3 and having lateral projections 22 extending into the wall apertures 10 and obliquely disposed guide shoulders 23 engageable with the guide surfaces 17 on the webs 18 for guiding it in its longitudinal movement relative to the housing, as do the guide tabs 15, the spring and spacer plates 12 and 13. Since each of the rubber pads 11 is linked to another pad through the spring plate 12 sandwiched therebetween, the spring plates in being guided by their tabs 15 in turn tend to center the rubber pads in the rear pocket 5. This centering action of the spring plates 12 is augmented or supplemented at each end of the rubber cushion by locating devices 24 formed in or interrupting the preferably flat, confronting front and rear faces 25 and 20 of the rear wall 7 and floating follower 21, respectively. These locating devices conveniently are in the form of a plurality of sockets in each of the faces 25 and 20 arranged thereabout in transversely spaced relation over the portion thereof covered by the adjoining rubber pad 11. The rubber cushion being under initial compression, as well as subject to further compression by longitudinal forces, the positioning sockets 24 will at all times be at least partially filled by rubber from the adjoining pad and this rubber in turn is effective to center the end spring units relative to the rear wall and the floating follower.

The similarity between the draft gears of the Blattner patent and this invention extends also to the preferred use as friction elements of the friction cushion or cushioning unit 4 of a pair of counterpart shoes or wedges 26 having substantially flat, inclined or sloping, forwardly flaring friction surfaces 27 extending substantially across the pocket and adapted to bear against or contact and frictionally engage correspondingly flat, sloping and forwardly flaring friction or wedging faces or surfaces 28 formed at opposite sides of the pocket on a pair of the longitudinal walls 8 and 9, preferably the unapertured walls 8. While each of the counterpart shoes 26 may have a plurality of friction surfaces in stepped or other suitable arrangement and the confronting side of the front or friction pocket 2 may be configured correspondingly, a single friction surface 27 on each shoe engageable with one of the pair of opposed friction faces 28 at opposite sides of the pocket, suffices and is preferred. The friction shoes 26 are urged apart into frictional engagement with the friction faces 28 by suitable resilient or spring means interposed between and acting outwardly on the shoes, such as the illustrated opposed pair of packs of semi-elliptic leaf springs 29.

For interlocking the friction shoes 26 to the housing 1 so as to hold the shoes and spring packs or shoe springs 29 in assembled relation in the housing in the normal, idle or expanded condition of the draft gear, each of the shoes is provided with an integral, relatively narrow foot or lip 30 projecting outwardly or outstanding transversely of the housing and normally transversely overlapping a rearwardly facing, inwardly directed or instanding shoulder or abutment 31 on the adjoining longitudinal or side wall 8 at the front end of a cavity 32 centrally interrupting the rear portion of the associated friction face 28 in which the foot normally is received.

In the draft gear of the Blattner patent, the friction faces on the housing terminate rearwardly or inwardly of the latter's open end and the friction shoes are contained entirely within the housing. However, in the draft gear of this invention, the friction faces 28 extend to and terminate at the front or open end 6 of the housing 1, and the friction shoes 26, while shiftable, telescopable, projectible or forceable inside the housing inwardly or rearwardly of that end, normally or in extended position project or extend through the open end forwardly or outwardly beyond the housing. Also, in order that the friction shoes may not only have greater travel than those of the Blattner patent but engender friction with the housing over the full range of that travel, the slope of the friction faces 28 and surfaces 27 is more gradual than provided in the patent, the slope to accommodate in the friction cushioning unit transversely acting shoe springs comparable in yieldable resistance to those of the Blattner patent and at the same time permit the shoes to travel at maximum about 3¼ in., being on the order of 17°–16'. While the slope of the friction faces and surfaces is less than that of the Blattner patent, the resultant reduction in resistance is more than counterbalanced by the longer travel. Consequently, even in its friction unit 4, the draft gear of this invention has higher capacity than that of the patent. Of more importance, the normal extension of the friction shoes beyond the housing reduces the overall length of the friction pocket 2 and, by applying this saving to the rubber pocket 3, the latter can accommodate a rubber cushioning unit 5 having more spring units and of correspondingly greater capacity than that usable in the patent. It is the marked increase in the capacity of the rubber cushioning unit that is mainly responsible for the remarkably high capacity of the present gear. The increase in the capacity of the rubber cushion also ensures that, after the gear has been compressed, the outward reaction will be adequate to cause the friction shoes to release despite the lesser release force exertable by the shoe springs 29.

The advantages derived from the above construction, in enabling the capacity of the draft gear to be increased and its reaction force at the same time to be reduced, are mainly responsible for the outstanding capabilities of the draft gear of this invention. However, these capabilities are not realizable unless the friction shoes 26 can be moved over their extended range of travel from their normal position in which they project beyond the open end 6 of the housing 1 to a point at which they are disposed entirely inwardly or rearwardly of that end. Nor are the capabilities realizable to the full unless, as in the Blattner patent, both the means for moving the shoes and the floating follower 21 are frictionally engaged by the shoes as the latter move toward each other transversely of the housing so as to contribute to the total friction developed by the friction cushioning unit 4. In the draft gear of this invention, both functions required of it are performed by the shoe moving means and that means also is enabled to be made a part of the draft gear.

In its preferred form, the means for moving the friction shoes 26 longitudinally of the housing 1 is a plunger or front follower 33 having a flat rear face 34 which the generally flat front ends 35 of the friction shoes engage and rub against, as do their generally flat rear ends 36, a flat front face or end 37 of the floating follower 21. Since the rear face 34 of the plunger 33 must move into the front pocket 2 in the housing 1 in order to maintain contact with the shoes 26 toward the inner limit of the shoes' travel, the body 38 of the plunger must be insertible or projectible into and at least the rear portion 39 of the body must be receivable, accommodatable or containable in that pocket. For this reason the rear portion 39 of the plunger conforms in configuration to the front part or mouth of the front pocket 2 and, while generally rectangular in cross-section and flat sided, has its sides 40 corresponding to those 8 of the housing on which the friction faces 28 are formed, beveled at a like slope to fit between those faces.

Although the plunger 33 might be interlocked to the housing 1 by connecting it directly thereto, this would require the provision on the plunger of rearward projections of sufficient length to extend normally into the housing and further would entail making at least one of the connecting means displaceable, as in the Blattner patent, to avoid excessive canting of the plunger during assembly. To eliminate potential failures due to the length of the projections required to extend normally into the housing as well as to avoid canting of the plunger during assembly, it accordingly is desirable that the plunger be connected to or interlocked with the housing through the friction shoes 26 with which it is at all times in contact, rather than directly. This is accomplishable by providing between the plunger and the shoes a dovetail or like releasable interlock which locks the plunger against accidental disassembly and is releasable to permit the plunger to be applied and removed at will. Comprised of a pair or plurality of elements on the plunger 33, each interfitting, mating or intercoupling with a related element on each shoe, the connection preferably is formed of a pair of transversely spaced lugs, prongs, clips or fingers 41, integral or rigid with and projecting rearwardly from the rear face of the plunger and each received or seated in a forwardly opening, transversely extending slot or groove 42 in and interrupting the front end of the shoes 26. Open at their outer ends, the slots 42 terminate at their inner ends obliquely, forwardly and outwardy inclined or sloping shoulders or abutments 43 which flare, spread or diverge from each other forwardly toward the plunger. Embracing or straddling the shoulders 43, the lugs 41 have inner or shoulder-confronting side surfaces 44 which together converge rearwardly toward the housing at a slope or inclination corresponding to that of the shoulders.

Preferably of a length relative to the projection of the shoes 26 such that they, as well as the body 38 of the plunger 33, are normally outside and beyond or spaced from the open end 6 of the housing, the lugs 41 in normal position transversely overlap the shoulders 42 and in that position effectively interlock the shoes 26 and plunger 33 against accidental disassembly or removal of the latter. However, this is not the only function they perform. With at least its body 38 wholly or entirely outside or beyond the housing 1 in normal position, the plunger 33 must be substantially centered on the housing if its telescoping thereinto under compressive forces is not to be impeded. By limiting the transverse spacing between the lugs 41 and shoulders 43, the latter, as they move toward normal position on transverse expansion of the shoes 26 under force of the shoe springs 29, will act transversely on one or another of the lugs, if the plunger is misaligned, and so restore the plunger to normal centered position when the gear has fully expanded. However, were this the only centering action on the plunger, it is conceivable that misalignment might occur within the point at which the shoulders and lugs are substantially in contact. Provision is therefore made for a like centering action on the plunger toward the opposite or inner extreme of its longitudinal movement relative to the housing. To this end, the lugs, which preferably are centered laterally on the rear face 34 of the plunger 33, are disposed adjacent the plunger's beveled sides 40 and have outer side surfaces 45, the front portions of which are aligned or coplanar with the beveled portions of those sides and the rear portions of which are further inturned therefrom. So tapering rearwardly and inturned as a whole toward each other and having portions of their outer side surfaces 45 sloped in correspondence with and adapted to confront and slide on the friction faces 28 on the housing, the lugs 41 toward the rearward limit of movement of the plunger relative to the housing serve as skids, on one or the other of which the relates friction face can exert a wedging action in case of misalignment of the plunger to restore the initial alignment.

If desired, the plunger 33 as a whole may be of a size to fit within the open end 6 of the housing when the draft gear is fully compressed, in which case a separate front follower block (not shown) will be employed to transmit longitudinal forces to the plunger and therethrough to the friction and rubber cushioning units 4 and 5. However, as in the illustrated embodiment, the body 38 may include as an integral front portion a front follower block 46. In such case, only the rear portion 39 will be receivable in the housing and the enlarged front portion 46 of substantially the outside transverse dimensions of the housing 1 will serve as the follower block, this not only eliminating the need for a separate front follower block but having the advantage of extending the self-centering action on the plunger to the follower block. The combining of the plunger and front follower into a single unit is feasible whether the follower block is required to have a flat front face or one of special configuration, such as that needed for the Type F coupler, the ready removability of the plunger in the latter case enabling the draft gear, if fitted with a plunger having a front face of a configuration inappropriate for a particular installation, to be adapted to that installation simply by interchanging its plunger with one having a front face of the required configuration.

With the friction and rubber cushioning units arranged in tandem in connected pockets and the shoes 26 of the friction unit serving as a rigid column for transmitting forces from the plunger through the floating follower to the rubber cushioning unit, the friction and rubber cushioning units will act in parallel under compressive forces. Consequently, both the higher capacity on partial travel of the friction cushioning unit and the high ultimate capacity of the rubber cushioning unit are always available for cushioning longitudinal forces to which the draft gear is subjected.

Not only is the draft gear of this invention of rugged construction and far more efficient in operation than any of comparable size heretofore approved or proposed, but its assembly is quite simple. In the first step, the floating follower 21 is inserted through one of the side openings 10 and positioned at the front of the rear pocket 3. This is followed by individually inserting the elements of the rubber cushioning unit in proper sequence into the rear pocket through the entry slot 19. This second step poses no problem even as to the last of the rubber spring units, since the rear pocket at that time is long enough to accommodate the floating follower and the rubber cushioning unit in the free or uncompressed state of the latter. Thereafter, the friction shoes 26 are inserted into the front pocket 2 through the open end 6 of the housing and forced rearwardly therein against the floating follower 21 until their feet 30 are past the shoulders 31 at the sides of the housing, in process compressing the rubber cushioning unit. Next, the shoe springs 29 are inserted through the front end of the housing into position between the shoes. With the shoes retracted, the lugs 41 of the plunger 33 are inserted into the slots 42 in the front ends of the shoes. At this stage, the plunger is forced rearwardly and frangible retainer blocks (not shown), of a thickness to hold the gear under partial compression without preventing interlock of the plunger and the shoes, are inserted between the feet 30 and shoulders 31 through holes 47 provided for that purpose in the sides of the housing. Finally, the outside force on the gear is released with consequent clamping of the retainer blocks between the feet 30 on the shoes and the related shoulders 31. Of a composition to disintegrate after a few blows in service, the retainer blocks preferably remain in place in the interim to facilitate installation of the draft gear by shortening its length below normal.

From the above detailed description, it will be apparent that there has been provided an improved friction-rubber draft gear which, in a size fittable into a standard 24⅝ in. draft gear pocket, provides a travel of 3¼ in. and far exceeds the requirements of the A.A.R. for draft gears of such size and travel. It should be understood that the described and disclosed embodiment is merely exemplary of the invention and that all modifications are intended to be included that do not depart from the spirit of the invention or the scope of the appended claims.

Having described my invention, I claim:

1. A friction-rubber draft gear comprising a housing having an open end, a plurality of connected pockets in tandem in and opening toward said open end of said housing, a rubber cushioning unit in an inner of said pockets, a friction cushioning unit in an outer of said pockets and including friction shoe means projecting in extended position through said open end beyond said housing and shiftable therefrom to a position within said housing inside said open end to increase the length of said inner pocket and the capacity of said rubber cushioning unit therein without corresponding decrease in the friction engenderable by said friction cushioning unit, and means engaging an outer end of said friction shoe means for shifting thereof toward said second-named position under longitudinal forces.

2. A friction-rubber draft gear comprising a housing having an open end, a plurality of connected pockets in tandem in and opening toward said open end of said housing, a rubber cushioning unit in an inner of said pockets, a friction cushioning unit in an outer of said pockets, a follower in said housing between said cushioning units, said friction cushioning unit including friction shoe means bearing rearwardly against said follower and projecting in extended position through and beyond said open end of said housing to increase the length of said inner pocket and the capacity of said rubber cushioning unit therein without corresponding decrease in the friction engenderable by said friction cushioning unit, and means engaging an outer end of said shoe means and operative under longitudinal forces for forcing said shoe means from said normal position at maximum to a position within said housing inwardly of said open end thereof.

3. A friction-rubber draft gear comprising a housing having an open end, a plurality of connected pockets in tandem in and opening toward said open end of said housing, a rubber cushioning unit in an inner of said pockets, a friction cushioning unit in an outer of said pockets and including friction shoe means projecting in extended position through said open end beyond said housing and shiftable therefrom to a position within said housing inside said open end to increase the length of said inner pocket and the capacity of said rubber cushioning unit therein without corresponding decrease in the friction engenderable by said friction cushioning unit, means engaging an outer end of said friction shoe means for shifting thereof toward said second-named position under longitudinal forces, and means for releasably interlocking said shifting means with said housing.

4. A friction-rubber draft gear comprising a housing having an open end, a plurality of connected pockets in tandem in and opening toward said open end of said housing, a rubber cushioning unit in an inner of said pockets, a friction cushioning unit in an outer of said pockets, said friction unit including friction shoe means releasably locked in said housing and projecting in extended position therefrom beyond said open end thereof, said shoe means being shiftable from said normal position to a rearward position in said housing inside said open end to increase the length of said inner pocket and the capacity of said rubber cushioning unit therein without corresponding decrease in the friction engenderable by said friction cushioning unit, means engaging an outer end of said friction shoe means for shifting thereof at maximum to said second-named position under longitudinal forces, and means releasably interlocking said shifting means to said shoe means and therethrough to said housing.

5. A friction-rubber draft gear comprising a housing having an open end, a plurality of connected pockets in tandem in and opening toward said open end of said housing, a rubber cushioning unit in an inner of said pockets, a friction cushioning unit in an outer of said pockets, said friction unit including friction shoe means releasably locked in said housing and projecting in extended position therefrom beyond said open end thereof, said shoe means being shiftable from said normal position to a position in said housing inside said open end to increase the length of said inner pocket and the capacity of said rubber cushioning unit therein without corresponding decrease in the friction engenderable by said friction cushioning unit, means engaging an outer end of said friction shoe means for shifting thereof at maximum to said second-named position under longitudinal forces, and means on said shoe means and cooperating with means on said shifting means for interlocking said shifting means in normal position to said shoe means and centering said shifting means in said position on said housing.

6. A friction-rubber draft gear comprising a housing having an open end, a plurality of connected pockets in tandem in said housing and opening forwardly toward said open end, opposed friction faces in said housing in a front of said pockets, a rubber cushioning unit in a rear of said pockets, a friction cushioning unit in said front pocket and including friction shoe means frictionally engaging said faces, said shoe means in extended position projecting forwardly beyond said open end of said housing and being shiftable therefrom to a rearward position within said housing rearwardly of said open end to increase the length of said inner pocket and the capacity of said rubber cushioning unit therein without corresponding decrease in the friction engenderable by said friction cushioning unit, means engaging a front end of said shoe means for shifting thereof under longitudinal forces at maximum to said rearward position, and means on said shifting means and interfitting with means on said shoe means for interlocking said shifting means in normal position to said shoe means, said means on said shifting means cooperating with said means on said shoe means and with said friction faces for centering said shoe means on said housing.

7. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging said housing and in extended position projecting forwardly through and beyond said open end and projectible rearwardly into said rear pocket against said rubber unit to increase the length of said inner pocket and the capacity of said rubber cushioning unit therein without corresponding decrease in the friction engenderable by said friction cushioning unit, and a plunger engaging an outer end of said shoe means, said plunger having a body normally disposed beyond said housing and projectible into said open end thereof for transmitting longitudinal forces to said shoe means and therethrough to said rubber cushioning unit.

8. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging said housing and in extended position projecting forwardly through and beyond said open end and projectible rearwardly into said rear pocket against said rubber unit, a plunger engaging an outer end of said shoe means, said plunger having a body normally disposed beyond said housing and projectible into said open end thereof for transmitting longitudinal forces to said shoe means and therethrough to said rubber cushioning unit, and means for releasably interlocking said plunger to said housing.

9. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging and limited in outward movement relative to said housing and in extended position projecting forwardly through and beyond said open end and projectible rearwardly into said rear pocket, a plunger engaging an outer end of said shoe means, said plunger having a body normally disposed beyond said housing and projectible into said open end thereof for transmitting longitudinal forces to said shoe means and therethrough to said rubber cushioning unit, and means on said plunger and cooperating with means on said shoe means for releasably interlocking said plunger to said housing.

10. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging and limited in outward movement relative to said housing and in extended position projecting forwardly through and beyond said open end and projectible rearwardly into said rear pocket, a plunger engaging an outer end of said shoe means, said plunger having a body normally disposed beyond said housing and projectible into said open end thereof for transmitting longitudinal forces to said shoe means and therethrough to said rubber cushioning unit, and a dovetail interlock between said plunger and shoe means for releasably interlocking said plunger to said housing.

11. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging and limited in outward movement relative to said housing and in extended position projecting forwardly through and beyond said open end and projectible rearwardly into said rear pocket, a plunger engaging an outer end of said shoe means, said plunger having a body normally disposed beyond said housing and projectible into said open end thereof for transmitting longitudinal forces to said shoe means and therethrough to said rubber cushioning unit, and lug means on and projecting rearwardly from said body of said plunger and interlocking with shoulder means on said shoe means for releasably interlocking said plunger to said housing.

12. A friction-rubber draft gear comprising a housing having an open end, inner and outer connected pockets in said housing and opening toward said open end, a rubber cushioning unit in said inner pocket, a friction cushioning unit in said outer pocket, said friction unit including friction shoe means frictionally engaging and limited in outward movement relative to said housing and in extended position projecting forwardly through and beyond said open end and projectible rearwardly into said rear pocket, a plunger engaging an outer end of said shoe means, said plunger having a body normally disposed beyond said housing and projectible into said open end thereof for transmitting longitudinal forces to said shoe means and therethrough to said rubber cushioning unit, and lug means on and projecting rearwardly from said body of said said plunger and interlocking with shoulder means on said shoe means for releasably locking said plunger to said housing, said lug means toward opposite limits of movement of said plunger relative to said housing cooperating respectively with said shoulder means and with means on said housing for centering said plunger on said housing.

13. A draft gear comprising a housing having an open end, connected inner and outer pockets in said housing and opening toward said open end, sides of said housing bounding opposite sides of said inner pocket having apertures narrower than and substantially coterminous longitudinally with said pocket, a rubber cushioning unit in said rear pocket and including alternating rubber pads and metal plates, an intermediate follower in said rear pocket at an outer end of said rubber unit, said plates and follower projecting and said rubber pads under compression flowing along said follower and plates into said apertures, inclined friction faces on sides of said housing at opposite sides of said outer pocket and flaring toward and extending to said open end, a pair of counterpart friction shoes in said outer pocket and having friction surfaces each inclined in correspondence and frictionally engageable with one of said friction faces, and spring means interposed between and acting transversely on said shoes for urging said friction surfaces and faces into frictional engagement, said shoes bearing rearwardly against said intermediate follower and in extended position projecting therefrom through said open end beyond said housing, and said shoes under longitudinal forces and within limits of compression of said spring means being forceable inwardly along said friction faces inside said open end.

14. A draft gear comprising a housing having an open end, connected inner and outer pockets in said housing and opening toward said open end, sides of said housing bounding opposite sides of said inner pocket having apertures narrower than and substantially coterminous longitudinally with said pocket, a rubber cushioning unit in said rear pocket and including alternating rubber pads and metal plates, an intermediate follower in said rear pocket at an outer end of said rubber unit, said plates and follower projecting and said rubber pads under compression flowing along said follower and plates into said apertures, inclined friction faces on sides of said housing at opposite sides of said outer pocket and flaring toward and extending to said open end, a pair of counterpart friction shoes in said outer pocket and having friction surfaces each inclined in correspondence and frictionally engageable with one of said friction faces, spring means interposed between and acting transversely on said shoes for urging said friction surfaces and faces into frictional engagement, said shoes bearing rearwardly against said intermediate follower and in extended position projecting therefrom through said open end beyond said housing and under longitudinal forces and within limits of compression of said spring means being forceable inwardly along said friction faces inside said open end to increase the length of said inner pocket and the capacity of said rubber cushioning unit therein without corresponding decrease in the friction engenderable by said friction cushioning unit, and plunger means bearing against outer ends of said shoes and having a body normally disposed beyond said housing for transmitting longitudinal forces to said shoes.

15. A draft gear comprising a housing having an open end, connected inner and outer pockets in said housing and opening toward said open end, sides of said housing bounding opposite sides of said inner pocket having apertures narrower than and substantially coterminous longitudinally with said pocket, a rubber cushioning unit in said rear pocket and including alternating rubber pads and metal plates, an intermediate follower in said rear pocket at an outer end of said rubber unit, said plates and follower projecting and said rubber pads under compression flowing along said follower and plates into said apertures, inclined friction faces on sides of said housing at opposite sides of said outer pocket and flaring toward and extending to said open end, a pair of counterpart friction shoes in said outer pocket and having friction surfaces each inclined in correspondence and frictionally engageable with one of said friction faces, spring means interposed between and acting transversely on said shoes for urging said friction surfaces and faces into frictional engagement, said shoes bearing rearwardly against said intermediate follower and in extended position projecting therefrom through said open end beyond said housing, and said shoes under longitudinal forces and within limits of compression of said spring mean being forceable inwardly along said friction faces inside said open end, plunger means bearing against outer ends of said shoes and having a body normally disposed beyond said housing for transmitting longitudinal forces to said shoes, and means releasably interlocking said plunger means to said shoes and therethrough to said housing.

References Cited in the file of this patent

UNITED STATES PATENTS

| | | |
|---|---|---|
| 2,141,680 | Barrows | Dec. 27, 1938 |
| 2,897,980 | Blattner | Aug. 4, 1959 |
| 2,925,182 | Blattner | Feb. 16, 1960 |
| 2,986,287 | Lusink | May 30, 1961 |